(12) United States Patent
Shibata

(10) Patent No.: US 6,601,639 B2
(45) Date of Patent: Aug. 5, 2003

(54) VEHICLE AIR CONDITIONER WITH ATTACHMENT AND DETACHMENT OF EVAPORATOR

(75) Inventor: Kazuji Shibata, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/488,249

(22) Filed: Jan. 20, 2000

(65) Prior Publication Data

US 2002/0170707 A1 Nov. 21, 2002

(30) Foreign Application Priority Data

Feb. 4, 1999 (JP) .......................................... 11-027863
Feb. 4, 1999 (JP) .......................................... 11-027865

(51) Int. Cl.⁷ .......................... F25B 29/00; B60H 1/32; B60H 3/00; B60H 1/00
(52) U.S. Cl. .............................. 165/42; 165/43; 165/76; 62/244; 62/299; 62/527; 62/528; 454/156; 237/12.3 B; 237/12.3 A
(58) Field of Search .......................... 165/202, 42, 43, 165/76; 62/528, 527, 299, 244; 454/156; 237/12.3 A, 12.3 B

(56) References Cited

U.S. PATENT DOCUMENTS

| | | | | |
|---|---|---|---|---|
| 3,662,818 A | * | 5/1972 | Snyder ........................ | 165/42 |
| 3,718,281 A | * | 2/1973 | Beatenbough et al. ........ | 165/42 |
| 3,731,729 A | * | 5/1973 | Beatenbough et al. ........ | 165/42 |
| 3,918,270 A | * | 11/1975 | Dixon et al. .................. | 62/244 |
| 4,574,873 A | * | 3/1986 | Kawahira ...................... | 165/42 |
| 5,101,883 A | * | 4/1992 | Kinmartin et al. ............. | 165/43 |
| 5,335,718 A | * | 8/1994 | Smith ........................... | 165/42 |
| 5,711,368 A | * | 1/1998 | Ito et al. ....................... | 165/43 |
| 5,715,705 A | * | 2/1998 | Kujirai et al. ................. | 62/528 |
| 5,724,817 A | * | 3/1998 | Nishishita .................... | 62/299 |
| 5,732,570 A | * | 3/1998 | Tomatsu et al. ............... | 62/527 |
| 5,737,936 A | | 4/1998 | Takasaki | |
| 5,755,107 A | * | 5/1998 | Shirota et al. ................ | 165/42 |
| 5,927,382 A | * | 7/1999 | Kokubo ........................ | 165/42 |
| 6,019,162 A | * | 2/2000 | Saida et al. ................... | 62/244 |
| 6,029,739 A | * | 2/2000 | Izawa et al. .................. | 62/244 |
| 6,101,828 A | * | 8/2000 | Shikata et al. ................ | 165/42 |

FOREIGN PATENT DOCUMENTS

| | | | | |
|---|---|---|---|---|
| GB | 2049 159 A | | 12/1979 | |
| JP | 59-167320 | * | 9/1984 | ................ 165/43 |
| JP | 60-1016 | * | 1/1985 | |
| JP | 60-113715 | * | 6/1985 | ................ 165/43 |
| JP | 9-267627 | * | 10/1997 | |
| JP | 10-71847 | * | 3/1998 | |
| JP | A-10-81123 | | 3/1998 | |
| JP | 10-100655 | * | 4/1998 | |
| JP | 11005428 | | 1/1999 | |

* cited by examiner

Primary Examiner—John K. Ford
(74) Attorney, Agent, or Firm—Harness, Dickey & Pierce, PLC

(57) ABSTRACT

In a vehicle air conditioner where an air conditioning unit is disposed at an approximate center within an instrument panel portion in a vehicle right-left direction, an evaporator is disposed to be inclined relative to the vehicle right-left direction by a predetermined angle so that a right seat side end (driver's seat side end) of the evaporator is placed at a vehicle front side and a left seat side end thereof is placed at a vehicle rear side while an air inlet surface of the evaporator extends in a vehicle up-down direction. Further, because an opening portion is provided at a left side surface of an air conditioning case, it is possible for the evaporator to be detached from the opening portion obliquely toward a vehicle left rear side. On the other hand, because a pipe connection member is connected to the right side end of the evaporator, a pipe structure of the evaporator become simple in a passenger compartment.

14 Claims, 4 Drawing Sheets

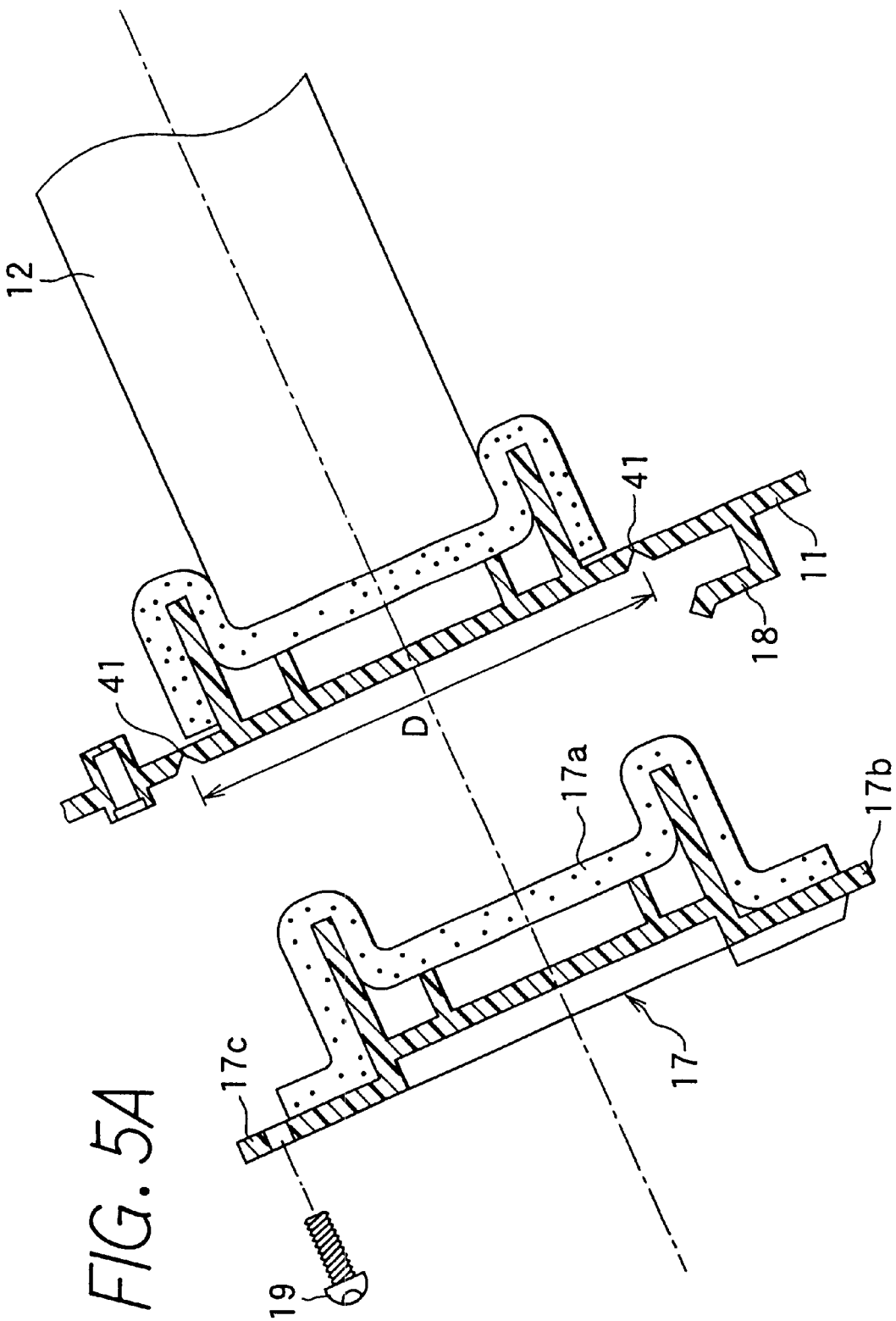

VEHICLE AIR CONDITIONER WITH ATTACHMENT AND DETACHMENT OF EVAPORATOR

CROSS-REFERENCE TO RELATED APPLICATION

This application is related to and claims priority from Japanese Patent Applications No. Hei. 11-27863 filed on Feb. 4, 1999, and No. Hei. 11-27865 filed on Feb. 4, 1999.

BACKGROUND OF THE INVENTION

1. Field of the Invention

The present invention relates to a vehicle air conditioner in which an evaporator is disposed with a simple pipe structure while detachment performance of the evaporator is improved.

2. Description of Related Art

In a conventional vehicle air conditioner, an air conditioning unit is disposed in an instrument panel portion on a front side of a passenger compartment at a center position in a vehicle right-left direction, and a blower unit is disposed to be offset from the air conditioning unit to a front passenger's side. For example, in U.S. Pat. No. 5,737,936, an evaporator is disposed within an air conditioning case in parallel with the vehicle right-left direction so that a heat-exchanging surface extends in a vehicle up-down direction. An opening portion for inserting the evaporator is opened in a side surface of the air conditioning case, and the evaporator is detached from the air conditioning case through the opening portion. However, because the evaporator is disposed in parallel with the vehicle right-left direction, the evaporator is need to be moved from the air conditioning case toward an inner side of the instrument panel portion when the evaporator is detached from the opening portion. Therefore, in this case, the evaporator may be interfered with compartments within the instrument panel portion, and detachment operation of the evaporator becomes difficult. Further, in the conventional air conditioner, air blown by the blower unit in parallel with the vehicle right-left direction is introduced into a front side surface of the evaporator and passes through the evaporator toward a vehicle rear side. Therefore, a predetermined space is necessary between the air conditioning case and the front side surface of the evaporator in the vehicle front-rear direction. Thus, it is necessary to connect a refrigerant inlet/outlet portion of the evaporator and a refrigerant cycle disposed in an engine compartment defined by a fire wall from the passenger compartment, by a connection pipe having a large length in a range of 300 mm–400 mm.

On the other hand, in a vehicle air conditioner described in JP-A-10-81123, an evaporator is disposed to be inclined relative to a horizontal direction. However, the evaporator is need to be detached from an air conditioning case obliquely upwardly toward an inner side of the instrument panel portion. Therefore, the evaporator may be interfered with any compartment within the instrument panel portion. Further, because the evaporator is inclined so that an inlet surface of the evaporator approximately extends in the horizontal direction, the interference range of the evaporator in the vehicle front-rear direction is enlarged, and the evaporator is difficult to be detached.

SUMMARY OF THE INVENTION

In view of the foregoing problems, it is an object of the present invention to provide a vehicle air conditioner in which a cooling heat exchanger is readily detached while an interference between the cooling heat exchanger and a component within an instrument panel portion is prevented.

It is an another object of the present invention to provide a vehicle air conditioner in which a pipe structure of a cooling heat exchanger within a passenger compartment becomes simple.

According to the present invention, in a vehicle air conditioner where an air conditioning unit is disposed in an instrument panel portion at an approximate center in a vehicle right-left direction, a cooling heat exchanger is disposed in an air conditioning case of the air conditioning unit to be inclined relative to the vehicle right-left direction in such a manner that one side end of the cooling heat exchanger in the vehicle right-left direction is placed at a vehicle front side and the other side end thereof is placed at a vehicle rear side while an air inlet surface (heat-exchanging surface) of the cooling heat exchanger extends in a vehicle up-down direction. Further, the air conditioning case has a side surface portion at the other side in the vehicle right-left direction, for detaching the cooling heat exchanger obliquely toward a vehicle rear side in the other side of the vehicle right-left direction from the air conditioning case. Thus, it can prevent an interference between the cooling heat exchanger and a component disposed in the instrument panel portion when the cooling heat exchanger is detached from the air conditioning case.

Preferably, the one side end of the cooling heat exchanger is placed at a driver's seat side within the passenger compartment, and the other side end of the cooling heat exchanger is placed at a front passenger's seat side of the passenger compartment. Generally, because any component is not disposed in a foot area of the front passenger's seat side, the cooling heat exchanger can be readily detached from the air conditioning case toward the foot area of the front passenger's seat area.

Further, a blower unit for blowing air into the air conditioning case is disposed to be offset from the air conditioning case to the front passenger's seat side in the vehicle right-left direction. Therefore, even in the arrangement of the vehicle air conditioner, the cooling heat exchanger is not interfered with the blower unit when the cooling heat exchanger is detached from the air conditioning case. Further, because the cooling heat exchanger is disposed to be inclined relative to the vehicle right-left direction, air blown by the blower unit in parallel with the vehicle right-left direction can be approximately uniformly flows through the cooling heat exchanger.

Further, the cooling heat exchanger has a pipe connection member at the one side end, for connecting with a component of a refrigerant cycle. Therefore, it is possible for the one side end of the cooling heat exchanger to be proximate to a fire wall for partitioning an engine compartment and the passenger compartment from each other. Thus, a pipe connection structure of the cooling heat exchanger, for connecting the cooling heat exchanger to a component in the engine compartment, can be made simple.

Preferably, the pipe connection member includes a joint portion integrated with the one side end of the cooling heat exchanger, and a pipe connector having a first end detachably connected to the joint portion. The cooling heat exchanger is an evaporator of a refrigerant cycle, and the refrigerant cycle includes an expansion valve, for decompressing refrigerant before being introduced into the evaporator. The expansion valve is disposed in the engine compartment defined from the passenger compartment by the fire wall having an opening at a position proximate to the pipe connector. Further, the pipe connector has a second end exposed into the engine compartment through the opening of the fire wall, and the expansion valve is connected to the pipe connector from the engine compartment to communicate with the joint portion of the evaporator through the pipe connector. Thus, the evaporator has a simple refrigerant pipe structure in the passenger compartment, while the expansion valve can be readily connected to the pipe connector of the evaporator from the engine compartment. Further, because the expansion valve is disposed in the engine compartment, noise generated from the expansion valve is hardly transmitted to the passenger compartment.

BRIEF DESCRIPTION OF THE DRAWINGS

Additional objects and advantages of the present invention will be more readily apparent from the following detailed description of preferred embodiments when taken together with the accompanying drawings, in which:

FIG. 5A is a cross-sectional view showing a cover member of an air conditioning unit according to a second preferred embodiment of the present invention, and FIG. 5B is a cross-sectional view showing a part of the air conditioning unit according to the second embodiment.

DETAILED DESCRIPTION OF THE PRESENTLY PREFERRED EMBODIMENTS

Figure 1:
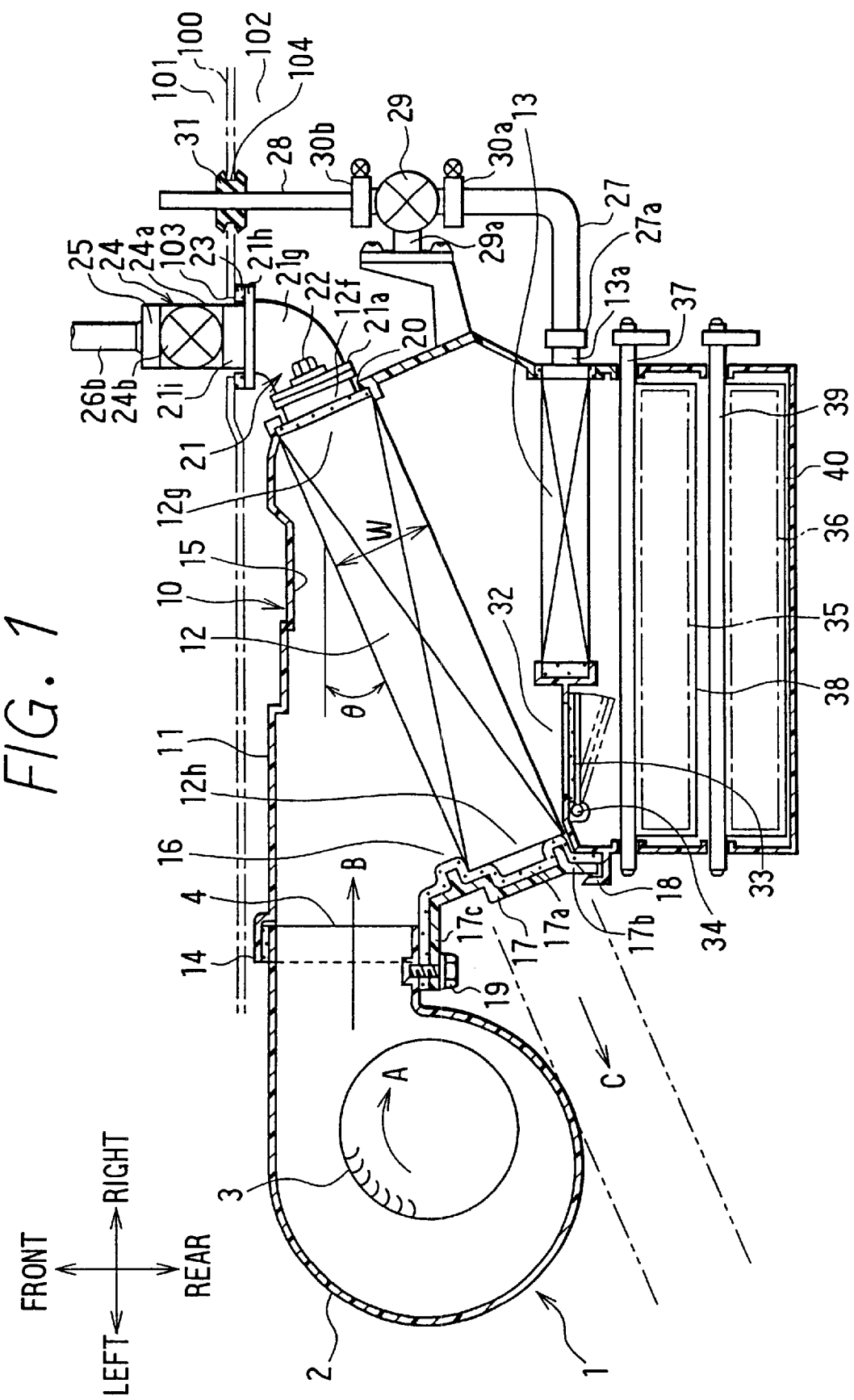
FIG. 1 is a schematic sectional view of a vehicle air conditioner according to a first preferred embodiment of the present invention.

Preferred embodiment of the present invention will be described hereinafter with reference to the accompanying drawings.

A first preferred embodiment of the present invention will be now described with reference to FIGS. 1–4. A vehicle air conditioner of the first embodiment includes a blower unit 1 and an air conditioning unit 10. The air conditioning unit 10 is disposed in an inner side of an instrument panel portion on a front side of a passenger compartment at an approximate center in a vehicle right-left direction. On the other hand, the blower unit 1 is disposed in the passenger compartment to be offset from the air conditioning unit 10 in the vehicle right-left direction. For example, when the present invention is typically applied to a vehicle having a right steering wheel, the blower unit is offset from the air conditioning unit 10 to a vehicle left side, as showing in FIG. 1. In the first embodiment, the blower unit 1 and the air conditioning unit 10 are mounted on the vehicle to correspond to the arrangement in FIG. 1 in the vehicle right-left direction and in a vehicle front-rear direction. Hereinafter, a driver's seat side of the vehicle is referred to as a vehicle right side, and a front-passenger's seat side of the vehicle is referred to as a vehicle left side.

The blower unit 1 includes a scroll case 2, and a centrifugal blower fan 3 disposed in the scroll case 2. The blower fan 3 is rotated by a motor in a direction shown by an arrow A in FIG. 1 so that air is blown into the air conditioning unit 10 through an outlet portion 4 of the scroll case 2 as shown by arrow "B" in FIG. 1. That is, air is blown by the blower unit 1 into the air conditioning case 10 approximately in parallel with the vehicle right-left direction.

A suction port (not shown) of the blower fan 3 is provided at an upper side in FIG. 1, and an inside/outside air switching box (not shown) is disposed on an upper side of the blower fan 3, so that inside air (i.e., air inside the passenger compartment) or outside air (i.e., air outside the passenger compartment) is blown by the blower fan 3.

The air conditioning unit 10 includes an evaporator (i.e., cooling heat exchanger) 12 and a heater core (i.e., heating heat exchanger) 13 which are integrally disposed within an air conditioning case 11 of the air conditioning unit 10.

The air conditioning case 11 is made of resin which has an elasticity to some degree and is superior in a strength, such as polypropylene, and is composed of plural division case portions. Plural division case portions of the air conditioning case 11 are integrally connected by a fastening unit such as a metal spring clip and a screw, after the evaporator 12, the heater core 13 and components such as a door described later are accommodated therein, to construct the air conditioning unit 10.

Figure 2:
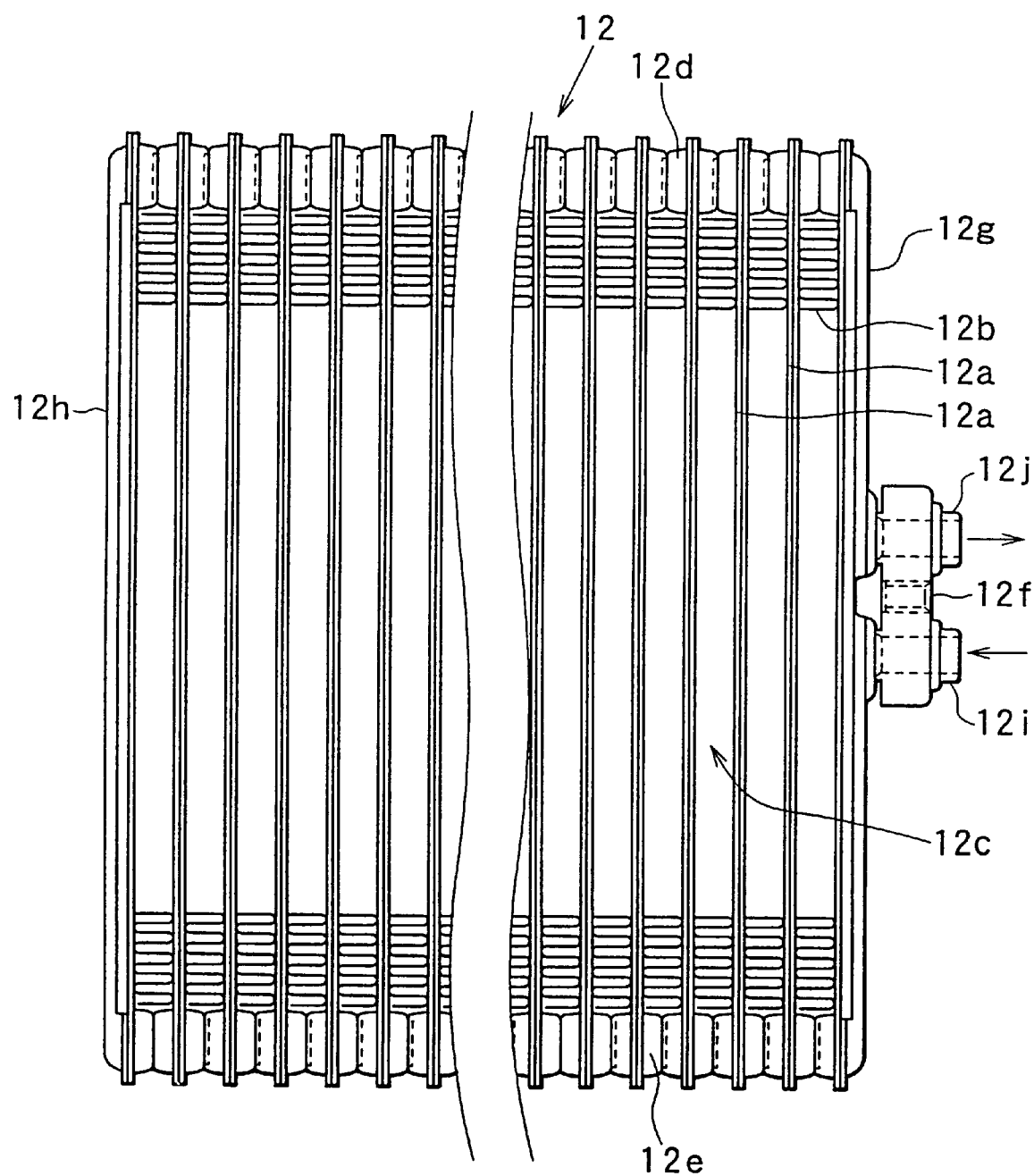
FIG. 2 is a front view showing an evaporator of the vehicle air conditioner according to the first embodiment.

The evaporator 12 is disposed within the air conditioning case 11 at a vehicle front side, and the heater core 13 is disposed in the air conditioning case 11 at a vehicle rear side from the evaporator 12. As shown in FIG. 2, the evaporator 12 includes a heat-exchanging core portion 12c which is formed by assembling plural flat tubes 12a and corrugated fins 12b. Each flat tube 12a is formed by connecting two thin metal plates such as aluminum alloy plates, so that a sectional flat refrigerant passage is defined therein. Both ends of each tube 12a in a longitudinal direction are integrally formed with tank portions 12d, 12e so that refrigerant passages between the tubes 12a communicate with each other through the tank portions 12d, 12e. The components of the evaporator 12 are integrally assembled by brazing. A joint portion 12f for performing a refrigerant introduction or a refrigerant discharge of the evaporator 12 is made of an aluminum alloy, and includes a refrigerant inlet 12i and a refrigerant outlet 12j.

The evaporator 12 is disposed in the air conditioning case 11 to cross an entire air passage within the air conditioning case 11. In a refrigerant cycle of the vehicle air conditioner, gas-liquid two-phase refrigerant having a low pressure flows into the evaporator 12, and absorbs an evaporation-latent heat from air passing through the evaporator 12, so that air passing through the evaporator 12 is cooled.

Next, an arrangement of the evaporator 12 in the air conditioning case 11 will be described in detail. The evaporator 12 is disposed in the air conditioning case 11 in such a manner that a heat-exchanging surface (e.g., air-inlet surface) of the core portion 12c extend in an up-down direction. That is, in a vehicle-mounting state, the up-down direction of the evaporator 12 disposed in the air conditioning case 11 corresponds to the up-down direction in FIG. 2. Further, the evaporator 12 is disposed to be inclined by a predetermined angle θ relative to the vehicle right-left direction so that a right side end 12g of the evaporator 12 is placed at a vehicle front side and a left side end 12h of the evaporator 12 is placed at a vehicle rear side. In the first embodiment, the predetermined angle θ is in a range of 20°–60°. The joint portion 12f is disposed in the right side end 12g of the evaporator 12.

An air inlet 14 is opened in a left side surface of the air conditioning case 11 on a vehicle front side from the evaporator 12. The outlet portion 4 of the scroll case 2 of the blower unit 1 is connected to the air inlet 14 of the air conditioning case 11. Therefore, air blown from the blower unit 1 flows into a front side surface (i.e., air inlet surface) of the evaporator 12.

A step-like wall surface 15 for uniformly distributing air passing through the evaporator 12 is provided within the air conditioning case 11 at a position opposite to the front side surface of the evaporator 12. Further, an opening portion 16 is opened in the left side surface of the air conditioning case 11. An opening area of the opening portion 16 is set to have a width dimension larger enough than the width dimension W of the evaporator 12. Further, a cover member 17 for closing the opening portion 16 is attached to the left side surface of the air conditioning case 11.

The cover member 17 is a plate-like member made of resin, and a packing member (i.e., seal member) 17a for preventing an air-leaking is attached an inner surface of the cover member 17. The cover member 17 is detachably attached relative to the air conditioning case 11. In the first embodiment, a vehicle-rear side end portion 17b of the cover member 17 is engaged with an inner side of a claw portion 18 provided in the air conditioning case 11. On the other hand, a vehicle-front side end portion 17c of the cover member 17 is fastened to a wall surface of the outlet portion 4 of the scroll case 2 by a screw (e.g., tapping screw) 19. Thus, the cover member 17 forms a part of a duct for defining the air inlet 14 of the air conditioning case 11.

On the other hand, an opening portion 20 is opened in a right side surface of the air conditioning case 11. The opening portion 20 is provided so that the joint portion 12f disposed in the right side end 12g of the evaporator 12 protrudes outside the air conditioning case 11. A refrigerant pipe connector 21 is detachably connected to the joint portion 12f of the evaporator 12.

Figure 3:
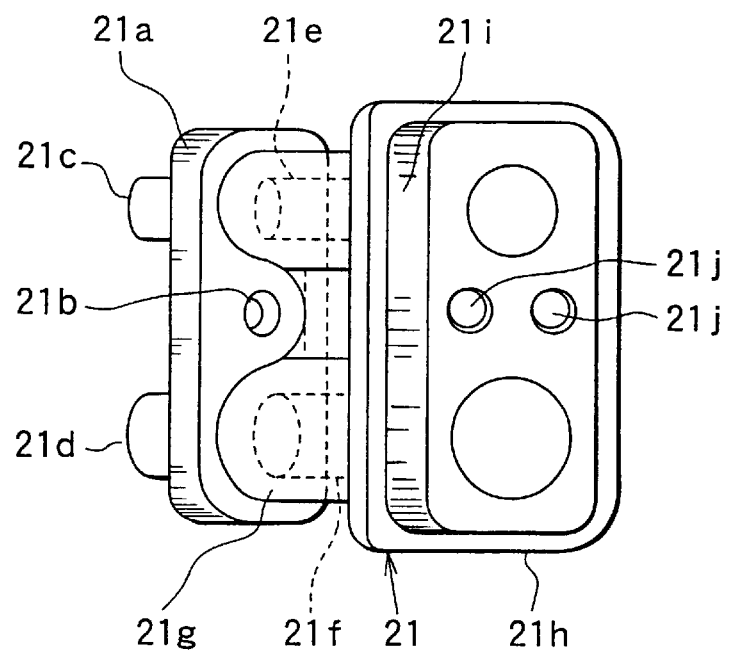
FIG. 3 is a perspective view of a pipe connector for the evaporator according to the first embodiment.

FIG. 3 shows the shape of the refrigerant pipe connector 21. The refrigerant pipe connector 21 is formed into the shape shown in FIG. 3 by cold-forging operation or cutting operation of metal such as aluminum. A rectangular first flange portion 21a is formed at one end of the joint portion 12f, and an attachment hole 21b is opened at a center area of the first flange portion 21a. A bolt 22 (see FIG. 1) is inserted into the attachment hole 21b, so that the refrigerant pipe connector 21 is fastened to the joint portion 12f by the bolt 22.

Inlet and outlet side pipe portions 21c, 21d protrude from a plate surface of the first flange portion 21a to be air-tightly connected to communication ports of the refrigerant inlet 12i and the refrigerant outlet 12j of the joint portion 12f through an O-ring (not shown).

In the refrigerant pipe connector 21, a connector body portion 21g having therein inlet and outlet side refrigerant passages 21e, 21f is integrally formed with the first flange portion 21a, and a rectangular second flange portion 21h is integrally formed with the other end side of the connector body portion 21g. A protrusion portion 21i having a rectangular shape slightly smaller than the outer peripheral dimension of the second flange portion 21h is integrally formed with an outer side of the second flange portion 21h. The refrigerant passages 21e, 21f are respectively opened in the protrusion portion 21i, and both screw holes 21j are opened in the protrusion portion 21i between the refrigerant passages 21e, 21f.

As shown in FIG. 1, an engine compartment 101 and the passenger compartment 102 are partitioned from each other by a fire wall 100. Because the evaporator 12 is disposed to be inclined by the predetermined angle θ relative to the vehicle right-left direction, the right side end 12g of the evaporator 12 is disposed to be proximate to the fire wall 100. Thus, the joint portion 12f and the refrigerant pipe connector 21 are disposed close to the fire wall 100.

An opening portion 103 is provided in the firewall 100 at a position proximate to the refrigerant pipe connector 21 to be opposite to the second flange portion 21h. The rectangular protrusion portion 21i of the second flange portion 21h of the refrigerant pipe connector 21 directly protrudes into the engine compartment 101 through the opening portion 103 provided in the fire wall 100. Thus, the refrigerant passages 21e, 21f of the refrigerant pipe connector 21 are directly placed in the engine compartment 101.

A packing member 23 is attached to an outer peripheral side of the protrusion portion 21i of the refrigerant pipe connector 21, and is press-fixed to the fire wall 100 by the second flange 21h so that the peripheral portion of the opening portion 103 is sealed. Therefore, it can prevent air within the engine compartment 101 from flowing into the passenger compartment 102 through the opening portion 103.

Figure 4:
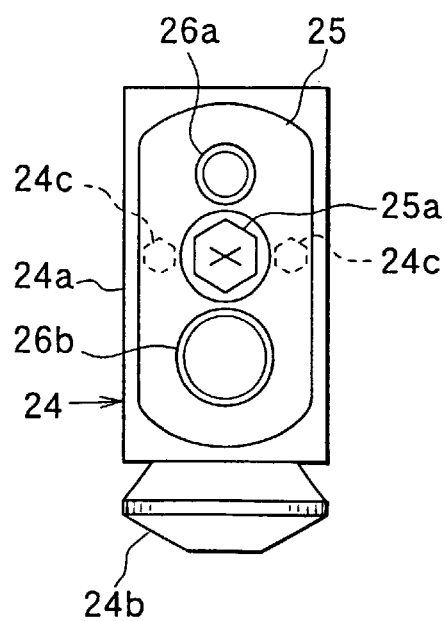
FIG. 4 is a front view showing a thermal expansion valve according to the first embodiment.

A thermal expansion valve 24 is disposed within the engine compartment 101 to be connected to the refrigerant pipe connector 21 from a side of the engine compartment 101. In the first embodiment, the expansion valve 24 is a type in which a temperature-sensing portion for sensing temperature of refrigerant at an outlet of the evaporator 12 is accommodated within a valve housing 24a. The valve housing 24a is made of metal such as aluminum, and is formed into a rectangular parallelopiped shape, as shown in FIG. 4. A diaphragm mechanism portion 24b is disposed at one end side of the valve housing 24a.

A pressure difference corresponding to temperature and pressure of refrigerant at the outlet side of the evaporator 12 is applied to the diaphragm mechanism portion 24b, a diaphragm accommodated in the diaphragm mechanism portion 24b is displaced in accordance with the pressure difference, and an opening degree of a valve body within the valve housing 24a is adjusted in accordance with the displaced amount of the diaphragm. By adjusting the opening degree of the valve body, an amount of refrigerant flowing into the evaporator 12 is adjusted, and a super-heating degree of refrigerant at the outlet of the evaporator 12 is maintained at a set value.

Because the protrusion portion 21i of the second flange portion 21h of the refrigerant pipe connector 21 protrudes into the engine compartment 101, the valve housing 24a of the thermal expansion valve 24 can be press-fitted to the plate surface of the protrusion portion 21i from the side of the engine compartment. Further, two bolts 24c are inserted into the screw holes 21j of the protrusion portion 21i as shown by the chain line in FIG. 4 so that the thermal expansion valve 24 can be detachably fastened and connected to the refrigerant pipe connector 21.

Further, a pipe joint 25 is connected to the valve housing 24a of the thermal expansion valve 24 on a surface opposite to the refrigerant pipe connector 21. The pipe joint 25 is made of metal such as aluminum. End portions of a high-pressure side liquid-refrigerant pipe 26a and a low-pressure side gas-refrigerant pipe 26b within the engine compartment 101 are beforehand bonded to passage hole portions of the pipe joint portion 25 by brazing. Thereafter, a single bolt 25a is inserted to penetrate through an attachment hole (not shown) at a center portion of the pipe joint portion 25, and is screwed into a screw hole (not shown) of the valve housing 24a of the thermal expansion valve 24, so that the pipe joint portion 25 can be detachably fastened to the valve housing 24a of the thermal expansion valve 24.

By the attachment of the pipe joint portion 25, it is possible for the high-pressure side liquid-refrigerant pipe 26a and the low-pressure side gas-refrigerant pipe 26b to communicate with inlet and outlet side refrigerant passages (not shown) of the thermal expansion valve 24. High-pressure liquid refrigerant from a receiver (not shown) of the refrigerant cycle flows into the inlet side refrigerant passage of the thermal expansion valve 24 through the high-pressure side liquid-refrigerant pipe 26a. Further, gas refrigerant evaporated in the evaporator 12 passes through the outlet side refrigerant passage of the thermal expansion valve 24, and thereafter, is introduced into a suction side of a compressor through the low-pressure side gas-refrigerant pipe 26b.

An insulator (not shown) made of a sponge-like insulating material is bonded onto the outer surfaces of the refrigerant pipe connector 21 and the joint portion 12f exposed into the passenger compartment, for preventing condensed water from being generated on the outer surfaces of the refrigerant pipe connector 21 and the joint portion 12f.

As shown in FIG. 1, the heater core 13 is disposed at a downstream air side (vehicle rear side) of the evaporator 12 at a position adjacent to the right-seat side (driver's seat side). The heater core 13 is for heating cool air having passed through the evaporator 12. In the first embodiment, hot water (i.e., engine-cooling water) flows through the heater core 13 so that air passing through the heater core 13 is heated by the hot water as a heating source.

The heater core 13 includes a hot water inlet-side tank, a hot water outlet-side tank, and a heat-exchanging core portion disposed between the hot water inlet-side tank and the hot water outlet-side tank. In the heat-exchanging core portion, plural flat tubes each of which is formed by thin metal plates to have a flat sectional shape and plural corrugated fins are alternately laminated, and are integrally brazed.

For example, the heater core 13 is a one-way flow type in which the hot water inlet-side tank of the heater core 13 is placed at a lower side and the hot water outlet-side tank of the heater core 13 is placed at an upper side within the air conditioning case 11 so that hot water from the hot water inlet-side tank flows through the flat tubes upwardly in one way toward the hot water outlet-side tank.

In FIG. 1, among hot water pipes connected to the heater core 13, only hot water inlet-side pipes 27, 28 are indicated, while hot water outlet-side pipes are not indicated. One end of the hot water inlet pipe 27 is connected to an inlet pipe 13a of the inlet side tank by a connection portion 27a.

A hot water valve 29 is detachably connected between the hot water inlet pipe 27 and the hot water outlet pipe 28 by clamps 30a, 30b, and is held in the air-conditioning case 11 through a bracket 29a. On the other hand, an opening portion 104 is opened in the fire wall 100 adjacent to the opening portion 103. The hot water inlet pipe 28 and the hot water outlet pipe (not shown) protrude into the engine compartment 101 through the opening portion 104, and are connected to a hot water circuit of a vehicle engine through hot water pipes within the engine compartment 101. Further, a seal member 31 made of rubber is attached to the hot water inlet pipe 28 and the hot water outlet pipe so that the opening portion 104 is sealed.

Thus, hot water from the vehicle engine flows into the heater core 13 through the hot water valve 29. The hot water valve 29 has therein a valve body for adjusting an opening degree of a hot water passage. By the opening degree adjustment of the valve body of the hot water valve 29, an amount of hot water flowing into the heater core 13 is adjusted and temperature of air blown into the passenger compartment is adjusted. The valve body of the hot water valve 29 is mechanically connected to a temperature-adjustment operation member (e.g., lever member) of the air-conditioning operation panel through a link mechanism and a cable to be manually operated.

As shown in FIG. 1, a width dimension of the heater core 13 in the vehicle right-left direction is smaller than that of the evaporator 12 by a predetermined length. Further, the heater core 13 is disposed in the air conditioning case 11 on a vehicle rear side from the evaporator 12 at a right side. Therefore, a cool air bypass passage 32 is provided at a left side of the heater core 13 within the air conditioning case 11. A cool air bypass door 33 for opening and closing the cool air bypass passage 32 is disposed at a left side of the heater core 13. In the first embodiment, the cool air bypass door 33 is a plate-like door rotatable around a rotation shaft 34.

The rotation shaft 34 of the cool air bypass door 33 is mechanically connected to the temperature-adjustment operation member of the air-conditioning operation panel through a link mechanism and a cable. That is, in the first embodiment of the present invention, both the hot water valve 29 and the cool air bypass door 33 are mechanically connected to the temperature-adjustment operation member through a connection mechanism (e.g., the link mechanism, the cable). Thus, both the hot water valve 29 and the cool air bypass door 33 can be operatively linked to be manually operated by the temperature-adjustment operation member.

On the other hand, a defroster opening 35, a face opening 36 and a foot opening (not shown) are opened in the air conditioning case 11 at a downstream air side (i.e., vehicle rear side) of the heater core 13 and the cool air bypass passage 32. The defroster opening 35 is opened in an upper side surface of the air conditioning case 11, so that conditioned air from the defroster opening 35 is blown toward an inner surface of a windshield through a defroster duct and a defroster air outlet (not shown). Further, the face opening 35 is opened in the air conditioning case 11 at a vehicle rear side from the defroster opening 35 so that conditioned air from the face opening 35 is blown toward the head portion of a passenger in the passenger compartment through a face duct and a face air outlet. Further, the foot opening is opened in lower surface of the air conditioning case 11 so that conditioned air from the foot opening is blown toward the foot area of the passenger in the passenger compartment through a foot duct and a foot air outlet.

The defroster opening 35 is opened and closed by a plate-like defroster door 38 which is rotatable by a rotation shaft 37. The face opening 36 is opened and closed by a plate-like face door 40 which is rotatable by a rotation shaft 39. Similarly, the foot opening is opened and closed by a foot door (not shown). With the opening/closing operation of the defroster door 38, the face door 40 and the foot door, an air outlet mode can be selected.

Next, operation of the vehicle air conditioner according to the first embodiment will be now described. When the blower fan 3 of the blower unit 1 operates, air is blown into the air conditioning case 11 of the air conditioning unit 10 as shown by arrow "B" in FIG. 1. On the other hand, a compressor is driven by the vehicle engine so that the refrigerant cycle operates and low-pressure gas-liquid two-phase refrigerant decompressed in the thermal expansion valve 24 flows into the evaporator 12.

Thus, refrigerant is evaporated in the evaporator 12 by absorbing evaporation-latent heat from air so that air passing through the evaporator 12 is cooled and dehumidified. Thereafter, air having passed through the evaporator 12 is heated in the heater core 13 to have a predetermined temperature, and is blown into the passenger compartment through the openings 35, 36 selectively opened by the doors 38, 40.

In the first embodiment, it is possible to perform the temperature adjustment of air blown into the passenger compartment by adjusting the amount of hot water flowing into the heater core 13 and by adjusting the air amount passing through the cool air bypass passage 32. The amount of hot water flowing into the heater core 13 is adjusted by the hot water valve 29, and the amount of cool air flowing through the cool air bypass passage 32 while bypassing the heater core 13 is adjusted by the cool air bypass door 33. During a maximum heating (during the maximum high air-temperature), the hot water valve 29 is fully opened and the cool air bypass door 33 is fully closed. Conversely, during a maximum cooling (during maximum low air-temperature), the hot water valve 29 is fully closed, and the cool air bypass door 33 is fully opened.

When a temperature control area is set between the maximum heating and the maximum cooling, the opening degree of the hot water valve 29 is set at a middle opening degree and the cool air bypass door 33 is opened by an opening degree. Thereafter, when the temperature-adjustment operation member of the air-conditioning operation panel is operated toward the maximum cooling, the opening degree of the cool air bypass door 33 is gradually increased. Thus, in the first embodiment, the temperature of air blown into the passenger compartment can be continuously linearly controlled between the maximum heating and the maximum cooling.

Next, refrigerant pipe connection relative to the evaporator 12 will be now described. As shown in FIG. 1, the evaporator 12 is disposed to be inclined relative to the vehicle right-left direction so that the right side end 12g of the evaporator 12 becomes close to the fire wall 100. Therefore, in the passenger compartment, only the refrigerant pipe connector 21 is connected to the joint portion 12f of the evaporator 12. The refrigerant pipe connector 21 may be formed to have a simple structure as shown in FIG. 3, and can be simply formed by cold-forging operation or cutting operation of metal such as aluminum.

Thus, after the refrigerant pipe connector 21 is fastened to the joint portion 12f of the evaporator 12 by using the single bolt 22 in the side of the passenger compartment 102, the expansion valve 24 is fastened to the refrigerant pipe connector 21 by using both the bolt 24c, and the pipe joint 25 is fastened to the expansion valve 24 by using the single bolt 25a in the side of the engine compartment 102. With the operation, the refrigerant pipe connection relative to the evaporator 12 is finished. Accordingly, it is unnecessary to use a connection pipe having a larger length between the joint portion 12f of the evaporator 12 and the opening portion 103 of the fire wall 100 in the passenger compartment.

Next, detachment operation of the evaporator 12 according to the first embodiment will be now described. After the air conditioner is amounted on the vehicle, the evaporator 12 may be need to be detached from the air conditioner for inspecting and repairing the evaporator 12 or for changing the evaporator 12. In this case, firstly in the right side space within the passenger compartment, the bolt 22 is loosen so that the connection between the joint portion 12f of the evaporator 12 and the refrigerant pipe connector 21 is released. Thereafter, in the left side space within the passenger compartment 102, the screw 19 is loosen so that the front side end portion 17c of the cover member 17 is detached from the outlet portion 4 of the scroll case 2. Further, the rear end portion 17b of the cover member 17 is detached from the claw portion 18 of the air-conditioning case 11, so that the cover member 17 is removed from the air conditioning case 11.

Thus, the opening portion 16 at the left side of the evaporator 12 is opened in the air conditioning case 11. Because the opening portion 16 is set to have a large enough opening area as compared with the width dimension W and a dimension in the vehicle up-down direction of the evaporator 12, the evaporator 12 can be drawn the opening portion 16. Further, because the evaporator 12 is disposed to be inclined relative to the vehicle right-left direction by a predetermined angle θ, the evaporator 12 can be drawn toward an inclined rear side of the foot area of a passenger on the front left seat through the opening portion 16, as shown by arrow "C" in FIG. 1.

If the evaporator 12 is drawn in parallel with the vehicle right-left direction, an interference between the evaporator 12 and a component mounted on the front left side within the instrument panel portion is caused. However, according to the first embodiment, because it is possible to draw the evaporator 12 toward a vehicle left rear side, the evaporator 12 is prevented from interfering with the blower unit 1 and a component mounted on a front left seat side within the instrument panel. Further, because any operation compartment is not disposed at the front passenger's foot area (e.g., front left-lower side), the detachment of the evaporator 12, shown by arrow "C" in FIG. 1, is readily performed.

Further, because the evaporator 12 is disposed to be inclined, a flow distribution of air passing through the evaporator 12 can be readily made uniform. That is, in the arrangement where the blower unit 1 is offset from the air conditioning unit 10 toward a left side, the air-blowing direction in the outlet portion 4 of the scroll case 2 of the blower unit 1 is approximately parallel to the vehicle right-left direction to be toward the vehicle right side, as shown by arrow "B" in FIG. 1. Therefore, in a case where the evaporator 12 is disposed to be parallel to the vehicle right-left direction, an air flow at the right side in the evaporator 12 becomes larger, and an air flow at the left side in the evaporator 12 becomes smaller. As a result, an ununiform air flow distribution is generated in the evaporator 12.

However, according to the first embodiment of the present invention, because the evaporator 12 is inclined so that the left side end 12h of the evaporator 12 is shifted toward the vehicle rear side, air blown from the scroll case 2 readily flows into the left side of the evaporator 12. Further, the step-like wall surface 15 for restricting the air flow toward the right side in the evaporator 12 is provided in the air conditioning case 11. As a result, in the first embodiment, with the combination between the inclination arrangement of the evaporator 12 and the step-like wall surface 15 of the air conditioning case 11, the flow distribution of air passing through the evaporator 12 can be made uniform.

According to experiments by the inventors of the present invention, preferably, the inclination predetermined angle θ is set to be in a range of 20°–60°. That is, for preventing an interference of the evaporator 12 with the left side components and the blower unit 1 when the evaporator 12 is detached, the inclination predetermined angle θ is set to be equal to or larger than 20°. On the other hand, for reducing the dimension of the air conditioning unit 10 in the vehicle front-rear direction, the inclination predetermined angle θ is set to be equal to or less than 60°. Further, when the inclination predetermined angle θ is set in a range of 25°–40°, the detachment performance of the evaporator 12 is improved while the dimension of the air conditioning unit 10 in the vehicle front-rear direction is effectively reduced.

A second preferred embodiment of the present invention will be now described with reference to FIGS. 5A, 5B. In the above-described first embodiment, before the air conditioner is mounted on the vehicle, the opening portion 16 for detaching the evaporator 12 and the cover member 17 for closing the opening portion 16 are provided in the air conditioning case 11. However, in the second embodiment, the opening portion 16 for detaching the evaporator 12 and the cover member 17 for closing the opening portion 16 are not provided in the air conditioning case 11 before the air conditioner is mounted on the vehicle. That is, FIG. 5B is an initial state of an air conditioner mounted on the vehicle. As shown in FIG. 5B, a thin wall portion 41 is provided in a left side wall of the air conditioning case 11 so that an area "D" having a side for sufficiently detaching the evaporator 12 is readily broken. The thin wall portion 41 is formed by an approximate V-shaped recess which is readily broken as compared with the other portion of the air conditioning case 11.

When a detachment of the evaporator 12 is necessary, the area "D" of the side wall surface of the air conditioning case 11 is broken at the thin wall portion 41 so that an opening portion having the area "D" is opened in the left side wall surface of the air conditioning case 11. Thus, in the second embodiment, the evaporator 11 is readily detached from the opening portion having the area "D", similarly to the first embodiment. After the evaporator 12 is re-attached into the air conditioning case 11, the cover member 17 is fixed to the air conditioning case 11 by using the claw portion 18 and the screw 19, similarly to the first embodiment. In the second embodiment, the other portions are similar to those in the first embodiment, and the effect similar to that in the first embodiment can be obtained.

Although the present invention has been fully described in connection with the preferred embodiments thereof with reference to the accompanying drawings, it is to be noted that various changes and modifications will become apparent to those skilled in the art.

For example, in the above-described first embodiment of the present invention, the packing member 23 for sealing is attached on the outer peripheral side of the protrusion portion 21*i* of the refrigerant pipe connector 21, and the packing member 23 is press-fixed to the fire wall 100 by the second flange portion 21*h*, so that the peripheral portion of the opening portion 103 is sealed. However, instead of the packing member 23, a seal member penetrating through the opening portion 103, similar to the seal member 31, may be used to seal between the refrigerant pipe connector 21 and the opening portion 103.

In the above-described first embodiment, the hot water valve 29 and the cool air bypass door 33 are coupled to the temperature-adjustment operation member of the air-conditioning operation panel through a mechanical connection mechanism such as the link mechanism, so that the hot water valve 29 and the cool air bypass door 33 are operatively linked with the operation of the temperature-adjustment operation member. However, the hot water valve 29 and the cool air bypass door 33 may be electrically controlled to be operatively linked. For example, the hot water valve 29 and the cool air bypass door 33 are electrically driven by a common single actuator (e.g., motor) through a link mechanism. In this case, electrical signal corresponding to a set temperature for the passenger compartment is generated by a temperature-adjustment operation member, and an operation amount of the actuator is controlled by the electrical signal corresponding to the set temperature, so that the opening degrees of the hot water valve 29 and the cool air bypass door 33 are electrically controlled to be operatively linked.

In the above-described first embodiment, the present invention is applied to the vehicle air conditioner where the temperature of air blown into the passenger compartment is controlled with the adjustment of hot-water flow amount of the hot water valve 29. However, the present invention may be applied to a vehicle air conditioner in which a hot water valve is omitted and the temperature of air blown into the passenger compartment is adjusted by an air mixing door for adjusting a ratio between an air amount flowing through the heater core 13 and an air amount bypassing the heater core 13.

In the above-described first embodiment, the present invention is applied to the semi-center type air conditioner where the air conditioning unit 10 is disposed in an inner side of the instrument panel portion of the passenger compartment 102 at an approximate center in the vehicle right-left direction and the blower unit 1 is offset from the air conditioner in the vehicle right-left direction. However, the present invention may be applied to an entire center type where the blower unit 1 is disposed at a vehicle front side of the air conditioning unit 10. In this case, the blower unit 1 may be disposed in the engine compartment 101, and air blown by the blower unit 1 may be supplied to a front side of the evaporator 12 in the air conditioning case 11 through an opening of the fire wall 100.

In the above-described first embodiment, the joint portion 12*f* of the evaporator 12 and the refrigerant pipe connector 21 are disposed at the right side of the air conditioning case 11. However, the joint portion 12*f* of the evaporator 12, the refrigerant pipe connector 21 and the like may be arranged at the left side of the air conditioning case 11.

Further, the claw portion 18 for an engagement described in the above-described first and second embodiments may be omitted, and both end portions 17*b*, 17*c* of the cover member 17 may be attached by using screws.

Such changes and modifications are to be understood as being within the scope of the present invention as defined by the appended claims.

What is claimed is:

1. An air conditioner in combination with a vehicle having an instrument panel on a front side within a passenger compartment, the instrument panel having a passenger's side and a driver's side, the vehicle having a fire wall through which an engine compartment and the passenger compartment are partitioned from each other, said air conditioner comprising:

an air conditioning case being disposed inside the instrument panel portion within the passenger compartment at an approximate center in a vehicle right-left direction;

a cooling heat exchanger disposed in said air conditioning case to be inclined relative to the vehicle right-left direction in such a manner that one side end of said cooling heat exchanger in the vehicle right-left direction is placed towards the driver's side adjacent the fire wall and the other side end thereof is placed towards the passenger's side spaced from the fire wall while an air inlet surface of said cooling heat exchanger extends in a vehicle up-down direction;

a blower unit for blowing air into the air conditioning case, said blower unit being disposed to be offset from said air conditioning case toward the passenger's side and being disposed such that the blower unit does not interfere with an extension of the air inlet surface of said cooling heat exchanger for permitting removal of said cooling heat exchanger for the air conditioning case; wherein:

said air conditioning case has a side surface portion at the passenger's side in the vehicle right-left direction, for removing said cooling heat exchanger from the air conditioning case exchanger obliquely toward a vehicle rear side in the passenger's side; and said side surface portion of said air conditioning case has a thin wall portion at which a part of said side surface portion is broken by a predetermined force so that an opening having a predetermined area for detaching said cooling heat exchanger is provided.

2. The combination according to claim 1, further comprising:

a heating heat exchanger disposed at a downstream air side of said cooling heat exchanger, for heating air passing therethrough; wherein:

said cooling heat exchanger is disposed within said air conditioning case in such a manner that air passes through said cooling heat exchanger from a vehicle front side toward a vehicle rear side; and said heating heat exchanger is disposed in said air conditioning case at the one side of said cooling heat exchanger in the vehicle right-left direction on the vehicle rear side from said cooling heat exchanger.

3. The combination according to claim 1, wherein:

said cooling heat exchanger is an evaporator of a refrigerant cycle; and said evaporator has a pipe connection member at the one side end, for connecting with the refrigerant cycle.

4. The combination according to claim 3, wherein:

said pipe connection member includes:

a joint portion integrated with the one side end of said cooling heat exchanger, at which a refrigerant inlet and a refrigerant outlet of said evaporator are joined, and a pipe connector having a first end detachably connected to said joint portion.

5. The combination according to claim 4, wherein:

said refrigerant cycle includes an expansion valve, for decompressing refrigerant before being introduced into said evaporator, disposed in the engine compartment fire wall;

said pipe connector has a second end exposed into the engine compartment through an opening of the fire wall at a position proximate to said pipe connector; and said expansion valve is connected to said pipe connector from the engine compartment to communicate with said joint portion of said evaporator through said pipe connector.

6. The combination according to claim 1, wherein the one side end of said cooling heat exchanger is connected to a front side wall of said air conditioning case in the vehicle front-rear direction.

7. The combination according to claim 1, wherein said cooling heat exchanger is inclined relative to the vehicle right-left direction by a predetermined angle, said predetermined angle being in a range of 20°–60°.

8. The combination according to claim 1, wherein:

the blower unit includes a blower fan for blowing air;

the blower fan has a rotation axis extending in the vehicle up-down direction.

9. The combination according to claim 1, wherein: while the cooling heat exchanger is removed through the opening, the cooling heat exchanger is positioned toward a vehicle rear side of the blower unit on the passenger's side without interfering with the blower unit.

10. The combination according to claim 1, wherein the side surface portion is adjacent the blower unit.

11. The combination according to claim 1, further comprising:

an attachment portion around said thin wall portion; and a cover member for closing the opening after said thin wall portion is removed, said cover member being attached to said surface portion through the attachment portion.

12. The air conditioner according to claim 1, wherein:

the cooling heat exchanger is removed from the opening of the air conditioning case after the thin wall portion is broken.

13. An air conditioner in combination with a vehicle having an instrument panel on a front side within a passenger compartment, the instrument panel having a passenger's side and a driver's side, the vehicle having a fire wall through which an engine compartment and the passenger compartment are partitioned from each other, said air conditioner comprising:

an air conditioning case being disposed inside the instrument panel portion within the passenger compartment at an approximate center portion in a vehicle right-left direction; and a cooling heat exchanger disposed in said air conditioning case to be inclined relative to the vehicle right-left direction in such a manner that one side end of said cooling heat exchanger in the vehicle right-left direction is placed toward the driver's side adjacent the fire wall and the other side end thereof is placed towards the passenger's side spaced from the fire wall while an air inlet surface of said cooling heat exchanger extends in a vehicle up-down direction; wherein:

said cooling heat exchanger has a pipe connection member at the one side end;

said pipe connection member includes a joint portion being integrated with the one side end of said cooling heat exchanger, and a pipe connector having a first end detachably connected to said joint portion;

said pipe connector is disposed in the passenger compartment; and said air conditioning case has a side surface portion at the passenger's side in the vehicle right-left direction, for removing said cooling heat exchanger from the air conditioning case exchanger obliquely toward a vehicle rear side in the passenger's side; and said side surface portion of said air conditioning case has a thin wall portion at which a part of said side surface portion is broken by a predetermined force so that an opening having a predetermined area for detaching said cooling heat exchanger is provided.

14. The combination according to claim 13, wherein:

said cooling heat exchanger is an evaporator of a refrigerant cycle;

said refrigerant cycle includes an expansion valve, for decompressing refrigerant before being introduced into said evaporator, disposed in the engine compartment fire wall;

said pipe connector has a second end exposed into the engine compartment through an opening of the fire wall, the opening being provided at a position proximate to said pipe connector; and said expansion valve is connected to said pipe connector from the engine compartment to communicate with said joint portion of said evaporator through said pipe connector.

* * * * *